United States Patent
Burrough

(10) Patent No.: US 10,496,579 B2
(45) Date of Patent: Dec. 3, 2019

(54) GRAPHICS PROCESSING UNIT WITH SENSOR INTERFACE

(71) Applicant: Bobby Gene Burrough, San Jose, CA (US)

(72) Inventor: Bobby Gene Burrough, San Jose, CA (US)

( * ) Notice: Subject to any disclaimer, the term of this patent is extended or adjusted under 35 U.S.C. 154(b) by 0 days.

(21) Appl. No.: 15/811,160

(22) Filed: Nov. 13, 2017

(65) Prior Publication Data

US 2019/0146941 A1    May 16, 2019

(51) Int. Cl.
| | | |
|---|---|---|
| *H04N 5/335* | (2011.01) |
| *G06T 1/20* | (2006.01) |
| *G06F 3/0346* | (2013.01) |
| *G06F 13/38* | (2006.01) |
| *G06F 13/10* | (2006.01) |
| *G09G 5/00* | (2006.01) |

(52) U.S. Cl.
CPC .......... *G06F 13/385* (2013.01); *G06F 3/0346* (2013.01); *G06F 13/102* (2013.01); *G06T 1/20* (2013.01); *G09G 5/006* (2013.01); *H04N 5/3355* (2013.01)

(58) Field of Classification Search
None
See application file for complete search history.

(56) References Cited

U.S. PATENT DOCUMENTS

| 7,483,058 | B1 * | 1/2009 | Frank .................... H04N 5/232 348/222.1 |
| 9,858,637 | B1 * | 1/2018 | Quach .................. G02B 27/017 |
| 2007/0035706 | A1 * | 2/2007 | Margulis ................ G03B 21/20 353/122 |
| 2009/0268045 | A1 * | 10/2009 | Sur ...................... G06K 9/00604 348/222.1 |
| 2010/0271289 | A1 * | 10/2010 | Goodart ................. G09G 5/006 345/3.1 |
| 2011/0304597 | A1 * | 12/2011 | Hyatt ................... G09G 3/3426 345/207 |
| 2014/0347439 | A1 * | 11/2014 | Jia ...................... H04N 5/23238 348/36 |

* cited by examiner

*Primary Examiner* — Joni Richer
(74) *Attorney, Agent, or Firm* — James M. Wu; JW Law Group

(57) ABSTRACT

Graphics processing unit (GPU) with sensor interface. In an exemplary embodiment, an apparatus includes a GPU that includes a host interface to communicate with a host central processing unit (CPU), a sensor interface to communicate over a sensor bus, and a sensor connected to the sensor bus. The sensor communicates sensor data through the sensor interface, so that the sensor data does not flow through the host interface to the GPU. In an exemplary embodiment, a method is provided for operating a GPU having a host interface to communicate with a host CPU and a sensor interface. The method includes sending control signaling through the sensor interface to control a sensor to capture sensor data, and acquiring the sensor data sent from the sensor through the sensor interface. The sensor data does not flow through the host interface to the GPU.

18 Claims, 5 Drawing Sheets

GRAPHICS PROCESSING UNIT WITH SENSOR INTERFACE

FIELD

The present invention relates to the operation of data processing systems. More specifically, the present invention relates to the design and operation of graphics processing units.

BACKGROUND

Computers are typically equipped with a central processing unit (CPU) that executes operating system instructions and user programs. The CPU executes program code in a primarily sequential manner, moving from one operation to the next. To increase the speed and efficiency of rendering data on a device display, some computers include a graphics processing unit (GPU). The GPU processes large arrays of data in a highly parallel manner, as is the case when rendering thousands of pixels on a display many times per second. In some cases, GPU's are used to perform intensive computational tasks, such as processing extremely large amounts of scientific data, for example, to simulate climate or astrophysical phenomenon. Typically, data is delivered to the GPU from the CPU over a host interface.

Environment sensors have matured significantly over the past twenty years, and are prevalent in everyday use. For example, billions of handheld devices (e.g. smartphones, tablet computers) have been sold and include at least one image sensor. Typically, these sensors output their data to the CPU, and the CPU stores this data in a central memory. If it is desired to process this data using a GPU, the CPU transfers the data from the central memory to a GPU memory using a host interface. Unfortunately, transferring the data over the host interface requires CPU processing time and also delays data processing since the GPU has to wait for the data to be loaded into its memory before processing can begin.

Therefore, it would be desirable to provide an efficient way for sensor data to be processed by a graphics processing unit to overcome the inefficiencies of conventional systems.

SUMMARY

In various exemplary embodiments, a graphics processing unit (GPU) with sensor interface is provided. In an exemplary embodiment, the GPU's sensor interface connects to environment sensors to acquire data from the sensors for processing by the GPU. Thus, the GPU bypasses interaction with any host CPU and/or host interface to eliminate processing inefficiencies. In exemplary embodiments, the sensor interface allows the GPU to efficiently process environment data captured by environment sensors, such as image data, device orientation data, position data, or other aspects of the environment that can be measured by one or more sensors.

In an exemplary embodiment, the sensor interface comprises a Mobile Industry Processor Interface (MIPI) that is connected to an image sensor. The GPU may thereby acquire images of the environment through the MIPI and store those images in a texture memory to be used to render effects of the environment on rendered elements (i.e. UI widgets, buttons, controls, etc.). In this arrangement, the GPU operates independently of any upstream host or CPU. Thus, the sensor interface results in GPU processing with higher system performance and increased efficiency. The upstream host (e.g., CPU) is not burdened with managing the transfer of sensor data to the GPU. The GPU acts on its own behalf to acquire the sensor data it needs. As such, the host system may focus on execution of user tasks.

In an exemplary embodiment, an apparatus is provided that comprises a graphics processing unit (GPU) that includes a host interface having host interface logic to communicate over a host bus with a host central processing unit (CPU), and a sensor interface having sensor interface logic to communicate over a sensor bus. The apparatus also comprises a sensor connected to the sensor bus. The sensor communicates sensor data to the GPU through the sensor interface so that the sensor data does not flow to the GPU through the host interface. Thus, the CPU and host interface are bypassed since the GPU communicates with the sensor directly.

In an exemplary embodiment, a method is provided for operating a graphics processing unit (GPU) having a host interface to communicate over a host bus with a host central processing unit (CPU) and a sensor interface, the method comprising sending control signaling through the sensor interface to control a sensor to capture sensor data; and acquiring the sensor data sent from the sensor through the sensor interface. The sensor data does not flow through the host interface.

In an exemplary embodiment, an apparatus is provided that includes a graphics processing unit (GPU) that comprises a host interface having host interface logic to communicate over a host bus with a host central processing unit (CPU), and means for interfacing. The apparatus also comprises a sensor coupled to the means for interfacing. The sensor communicates sensor data to the GPU through the means for interfacing. The sensor data does not flow through the host interface.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which should not be taken to limit the invention to the specific embodiments, but are for explanation and understanding only.

DETAILED DESCRIPTION

Figure 1:
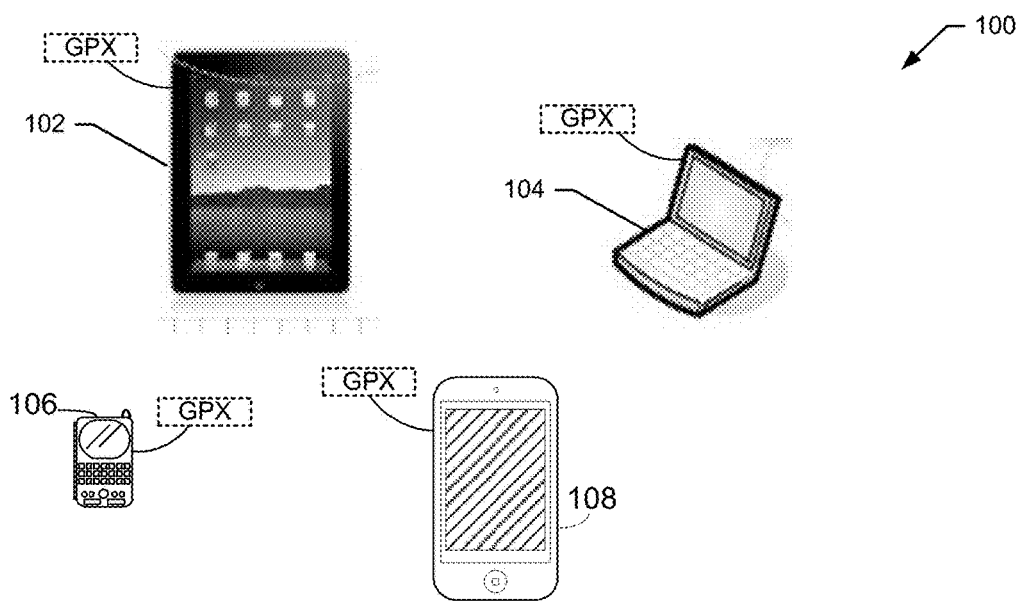
FIG. 1 shows devices comprising exemplary embodiments of a graphics processing system with sensor interface.

The purpose of the following detailed description is to provide an understanding of one or more embodiments of the present invention. Those of ordinary skill in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business-related constraints, and that these specific goals will vary from one implementation to another and from one developer to another. Moreover, it will be understood that such a development effort might be complex and time-consuming, but would nevertheless be a routine undertaking of engineering for those of ordinary skill in the art having the benefit of the embodiments of this disclosure.

Various exemplary embodiments illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

FIG. 1 shows devices 100 comprising exemplary embodiments of a graphics processing system (GPX). In an exemplary embodiment, the GPX comprises a graphics processing unit (GPU) having a sensor interface to transfer sensor data from one or more sensors directly to the GPU. The devices shown include tablet computer 102, notebook computer 104, cell phone 106, and smart phone 108. It should be noted that embodiments of the GPX are suitable for use with virtually any type of device to efficiently control environment sensors and to transfer sensor data directly to a GPU for processing, thereby bypassing a host CPU to avoid inefficiencies associated with the host CPU and host interface bus. In addition to the devices shown in FIG. 1, the GPX also is suitable for use with automobile dashboard systems, billboards, stadium big screens and virtually all devices that utilize a GPU to process sensor data.

Figure 2:
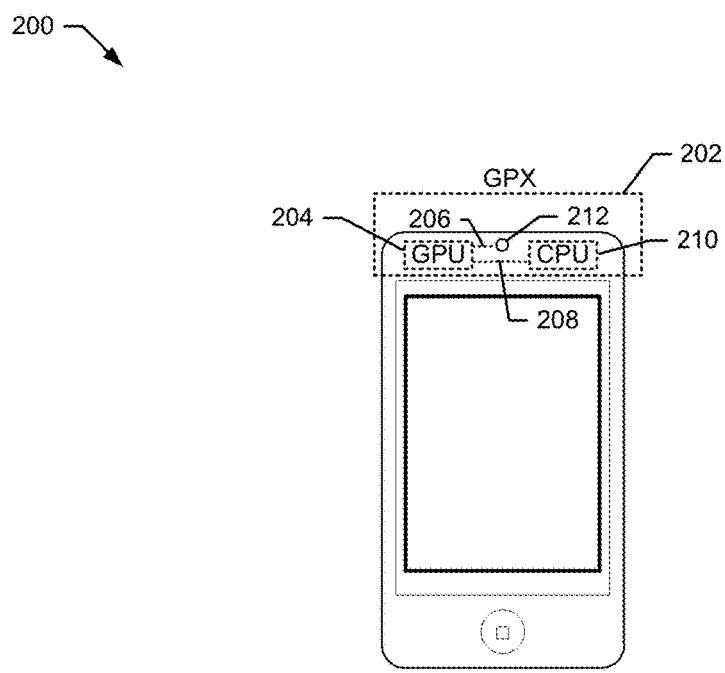
FIG. 2 shows a device that includes an exemplary embodiment of a graphics processing system with sensor interface.

FIG. 2 shows a device 200 that includes an exemplary embodiment of a GPX 202. The GPX 202 includes graphics processing unit (GPU) 204 that has a sensor interface to communicate with image sensor 212 using sensor bus 206. The GPU 204 also includes a host interface to communicate with a host central processing unit (CPU) 210 using host bus 208. It should be noted that the GPX 202 can have any number of environment sensors connected to the sensor bus 206 and these sensors can communicate sensor data directly to the GPU 204 over the sensor bus 206.

The image sensor 212 operates to acquire real-time images of the environment surrounding the device 200. In an exemplary embodiment, the image sensor 212 communicates directly with the GPU 204 over the sensor bus 206 to transmit image data directly from the image sensor 208 to the GPU 204, while bypassing the CPU 210 and the host interface 208. In an exemplary embodiment, the information communicated over the sensor bus 206 between the sensor 212 and the GPU 204 includes image data and control signaling. For example, the GPU 204 transmits control signaling over the sensor bus 206 to the image sensor 212 to control image sensor operation. The sensor 212 then outputs it data over the sensor bus 206 to the GPU 204 for processing. Once the image data is received by the GPU 204, it processes the image data to generate, for instance, display data for display on the device 200. Thus, bypassing the host bus 208 and host CPU 210 while communicating sensor data over the sensor bus 206 directly to the GPU 204, results in increased data transfer efficiency and processing over conventional systems.

Figure 3:
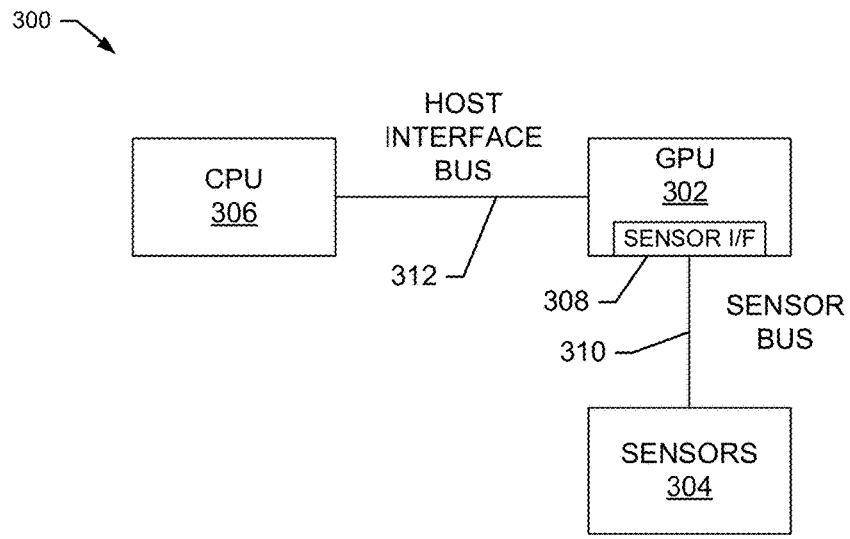
FIG. 3 shows a detailed exemplary embodiment of a graphics processing system with sensor interface.

FIG. 3 shows an exemplary embodiment of GPX 300. The GPX 300 is suitable for use as the GPX 202 shown in FIG. 2. The GPX 300 includes GPU 302, sensors 304, and CPU 306. The GPU 302 also comprises sensor interface (I/F) 308.

In an exemplary embodiment, the sensor I/F 308 comprises sensor interface logic that includes at least one of a processor, state machine, field programmable logic, memory, registers, logic, or discrete components that are configured to perform the functions described herein. The sensor I/F 308 provides communication between the GPU 302 and one or more sensors 304 using sensor bus 310 to transfer both sensor data and control signaling. For example, if the sensors 304 include an image sensor, the image data transmitted to the GPU 302 over the sensor bus 310 includes color information as is typical of digital images. The control signaling includes non-image data such as image sensor configuration information (e.g., exposure level and EXIF key/value pairs). Thus, as illustrated in FIG. 3, the sensor I/F 308 communicates with sensors using the sensor bus 310 to allow sensor data to be input directly to the GPU 302 while bypassing the CPU 306 or host interface bus 312.

In an exemplary embodiment the CPU 306, GPU 302, and sensor I/F 308 are implemented as logical blocks on a single system-on-chip (SoC) integrated circuit. The sensor I/F logical block is connected directly to the GPU logical block such that the GPU logical block controls and communicates directly with sensors external to the system-on-chip package. Connections to the sensor I/F are routed to sensors through a series of surface-mount-device pins. Sensors external to the system-on-chip integrated circuit are connected to the pins through circuitry on a flexible printed circuit board. In an exemplary embodiment, the assembly is installed in a handheld computing device.

Figure 4:
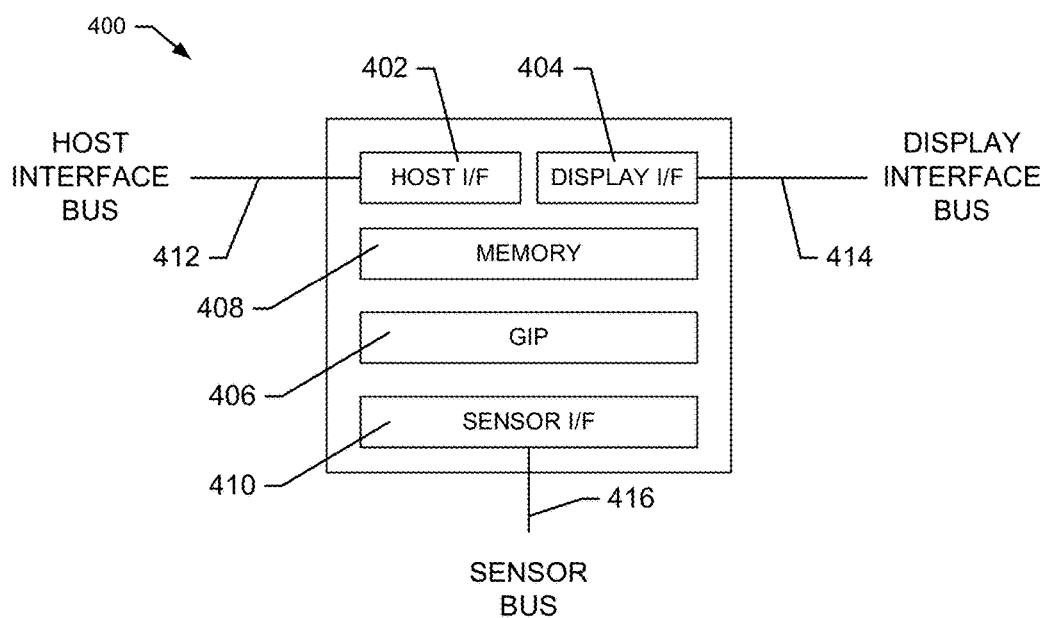
FIG. 4 shows a detailed exemplary embodiment of a graphics processing unit having a sensor I/F.

FIG. 4 shows a detailed exemplary embodiment of a graphics processing unit 400 having a sensor I/F 410. For example, the GPU 400 is suitable for use as the GPU 302 shown in FIG. 3. The GPU 400 includes host I/F 402, display I/F 404, graphics instruction processor (GIP) 406, memory 408, and the sensor I/F 410. The GPU 400 also includes internal buses (not shown) to allow communication between the internal components.

The host I/F 402 comprises host interface logic that provides communication with a host CPU over a host interface bus 412. The display I/F 404 comprises display interface logic that provides communication with a display device over a display interface bus 414. The GIP 406 comprises a processor, state machine, registers, memory and/or other logic that executes GPU instructions to send commands and/or receive and process data. The memory 408 is used to store data and/or GIP instructions.

In an exemplary embodiment, the sensor I/F 410 is connected to a sensor I/F bus 416 that allows the GPU 400 to communicate with and control environment sensors connected to the sensor bus 416. As such, the GPU 400 can load data from sensors connected to the sensor bus 416 independent of any action by an upstream CPU or host that is connected to the host interface bus 412. Thus, the sensor I/F 410 provides a communication path for transferring sensor-originated data into the GPU without saturating the bandwidth of, or otherwise burdening the upstream CPU or host.

In an exemplary embodiment, the sensor I/F 410 comprises a mobile industry processor interface (MIPI) that communicates with image sensors or other types of compatible sensors. In other embodiments, the sensor I/F 410 comprises other interface technologies allowing the GPU 400 to directly communicate with a variety of environment sensors. For example, the sensor I/F 410 may comprise other interface technologies as illustrated in the following list of interface technologies. It should be noted that the following list is not exhaustive and that the sensor I/F 410 may comprise other interface technologies not included in the follow list.
1. CSI—camera serial interface
2. PCI—peripheral component interconnect interface
3. PCIe—peripheral component interconnect express interface
4. Data Bus—one or more data lines connecting two endpoints
5. I2C—inter-integrated circuit interface
6. I3C—improved inter-integrated circuit interface
7. SPI—serial peripheral interface In various exemplary embodiments, the GIP 406 of the GPU 400 includes registers used for program execution, data acquisition, data storage, data processing and other functions. The following is a list of exemplary registers utilized by the GIP 406.

PC—program counter register

IR—instruction register

SA—source address register to be used by the current instruction

DA—destination address register to be used by the current instruction

RR—range register providing range of the current instruction

In various exemplary embodiments, the GIP 406 executes instructions that control the operation of the sensor I/F 410 and sensor I/F bus 416. Table 1 shown below illustrates exemplary instructions executed by the GIP 406 to control operation of the sensor I/F 410 and sensor I/F bus 416. It should be noted that the following table of instructions is an exemplary subset of GPU instructions that is not exhaustive and that other instructions can be utilized.

TABLE 1

| id | name | SA register | DA register | RR register | description |
|---|---|---|---|---|---|
| 0x00 | register set | data | register ID | not used | used to store arbitrary data in a register |
| 0x01 | mem copy | source address | dest address | word count | copy data from/to GPU memory |
| 0x02 | mem register | source address | register ID | not used | copy data from memory to register |
| 0x03 | init gpu | not used | dest address | word count | initialize area of GPU memory |
| 0x04 | init sensor | not used | not used | not used | trigger sensor's internal initialization routine |
| 0x05 | copy data | sensor ID | dest address | word count | copy data from the sensor's memory buffer into GPU memory |
| 0x06 | acquire | not used | sensor ID | not used | trigger sensor's data acquisition routine |
| 0x07 | block | not used | sensor ID | not used | used to block until a sensor indicates that it is ready to acquire new data |

In various exemplary embodiments, the GIP 406 of the GPU 400 executes instructions to acquire data from one or more sensors over the sensor bus 416. The exemplary program code that follows illustrates exemplary instructions executed by the GIP 406 to control operation of the sensor I/F 410 and sensor I/F bus 416 to acquire sensor data. It should be noted that the following instructions are exemplary and that other instructions can be utilized.

```
init:
    (register set) 0x200, DA        ; initialize GPU memory
    (register set) 0xFF, RR
(init gpu)
    (register set) 0x01, DA         ; initialize sensor #1
(init sensor)
    (register set) 0x02, DA         ; initialize sensor #2
(init sensor)
    (register set) 0x01, DA         ; tell sensor #1 to acquire data
(acquire)
(block)                             ; wait for sensor #1 to complete acquisition
    (register set) 0x01, SA         ; copy data from sensor #1 to memory
    (register set) 0x200, DA
    (register set) 0xFF, RR
(copy data)
    (register set) 0x02, DA         ; tell sensor #2 to acquire data
(acquire)
```

-continued

```
(block)                    ; wait for sensor #2 to complete acquisition
(register set) 0x02, SA    ; copy data from sensor #2 to memory
(register set) 0x200, DA
(register set) 0xFF, RR
(copy data)
```

Figure 5:
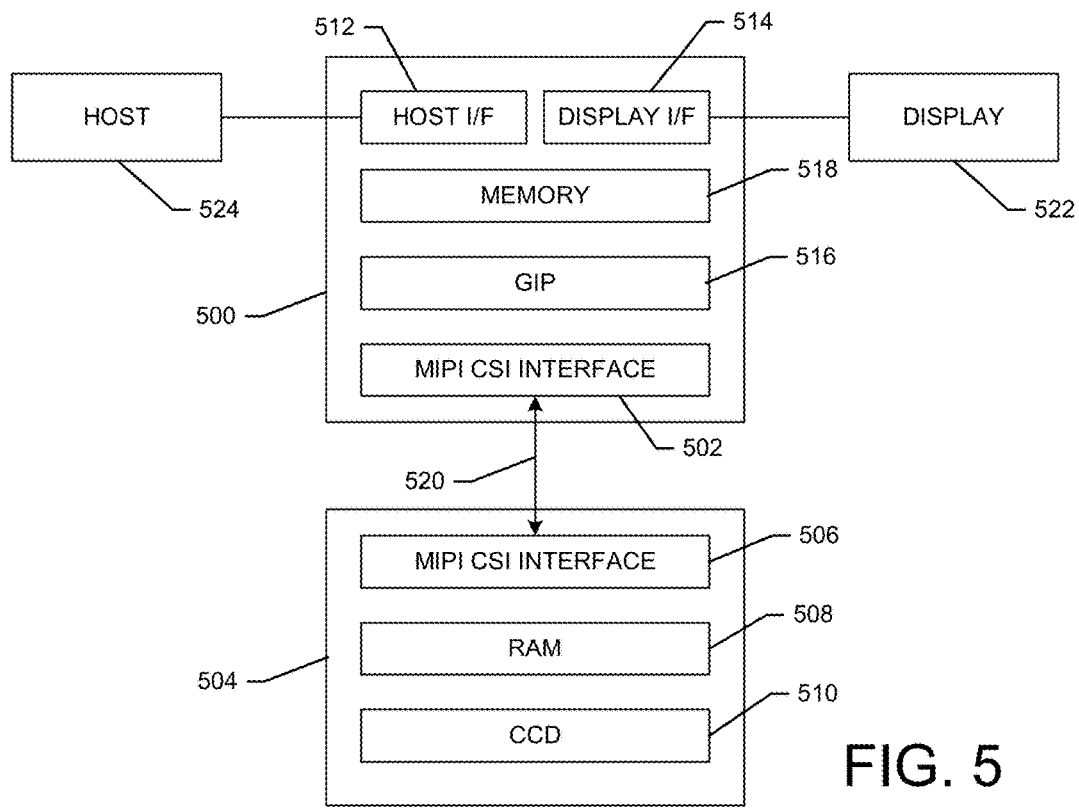
FIG. 5 shows a detailed exemplary embodiment of a graphics processing unit having a sensor interface comprising a MIN CSI interface.

In various exemplary embodiments, the sensor I/F 410 communicates with a variety of environment sensors to acquire sensor data that can be copied directly to the memory 408 of the GPU 400. The following is an exemplary list of sensors that the sensor I/F 410 can communicate with to acquire sensor data directly to the memory 408. It should be noted that this list is non-exclusive and not comprehensive but is illustrative of the various types of environment sensors that may be connected to the sensor I/F 410 for data acquisition.
1. image sensor
2. ambient light sensor
3. accelerometer sensor
4. gyroscope sensor
5. compass sensor
6. inertial measurement sensor
7. light source sensor
8. face detector sensor
9. global positioning system (GPS) sensor
10. barometric pressure sensor
11. altimeter sensor
12. ultrasonic sensor
13. Micro-electro-mechanical system (MEMS) sensor (e.g., MEMS accelerometer)
14. time measurement sensor FIG. 5 shows a detailed exemplary embodiment of a graphics processing unit 500 having a sensor interface comprising a MIPI CSI interface 502.

In an exemplary embodiment, a smartphone is equipped with the graphics processing unit 500 and includes a high resolution, auto-exposing image sensor 504 that comprises a MIPI CSI interface 506, internal random-access memory (RAM) 508 and charge-coupled device (CCD) 510. The GPU 500 comprises host I/F 512, display I/F 514, GIP 516, memory 518 and the MIPI CSI interface 502.

The GIP 516 executes instructions and sends commands to control the image sensor 504 by communicating information between the MIPI CSI interface 502 and MIPI CSI interface 506 using sensor bus 520. The GIP 516 acquires both color and non-color data (e.g. exposure level) from the image sensor 504 through the MIPI CSI interface 502. For example, the GIP 516 sends control instructions through the MIPI CSI interface 502 to the MIPI CSI interface 506 to control the operation of the image sensor 504. For example, the image sensor 504 can be controlled to capture an image using the CCD 510 and to store the image data into the RAM 508. The GIP 516 controls the image sensor 504 through the MIPI CSI interface 502 to transfer the captured image from the RAM 508 through the sensor bus 520 to the memory 518 of the GPU 500. Thus, the captured sensor data does not flow through the host interface 512. The GIP 516 processes the image stored in the memory 518 to render visual effects directly to a device display 522 using display interface 514.

In an exemplary embodiment, the GPU 500 is programmed to analyze images from the image sensor to detect high level data about faces and light sources and/or the position of each face and light source in the image. The GPU uses that data as control parameters for rendering of perspective effects (e.g., adjustment of a 3D scene camera view frustum) and lighting effects (e.g., image based lighting and arrangement of directional lights in the 3D scene, including position, orientation, color, and brightness).

Thus, the GPU 500 controls the image sensor 504 independent of any other component of the smartphone (e.g., independent of upstream host components, such as CPU 522, DMA controller, memory controller, or CPU-controlled bus). The GPU 500 is therefore able to directly acquire and process captured images faster and more efficiently than conventional systems that utilize a central CPU to control external environment sensors to capture sensor data.

Figure 6:
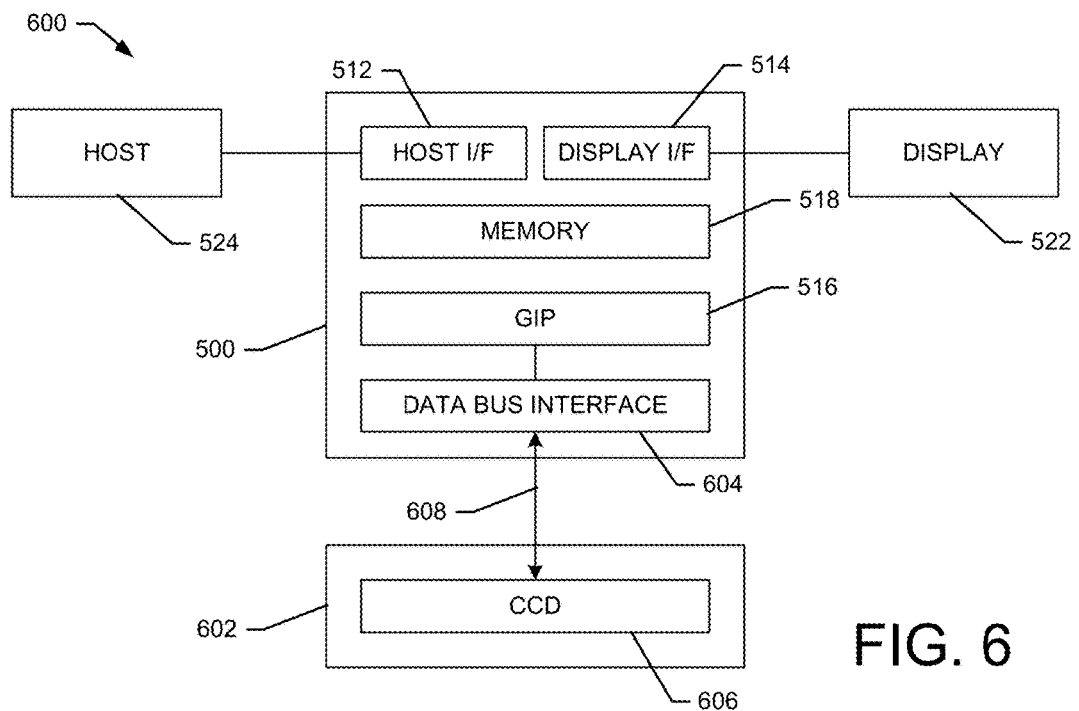
FIG. 6 shows a detailed exemplary embodiment of a graphics processing unit having a sensor interface comprising a data bus interface.

FIG. 6 shows a detailed exemplary embodiment of a graphics processing unit 500 having a sensor interface comprising a data bus interface 604.

In an exemplary embodiment, a smartphone is equipped with the graphics processing unit 500 and includes a high resolution, auto-exposing image sensor 602 that comprises CCD 606. It should be noted that the image sensor 602 may also comprise data buffers and control circuitry (not shown) that store image data in memory, optionally compress it, transmit it instructed to do so, and govern processes like auto-exposure. The GIP 516 executes instructions to control the image sensor 602 by communicating information between the data bus interface 502 and the image sensor 602 using sensor bus 608. The GIP 516 acquires both color and non-color data (e.g., exposure level) from the image sensor 602 through the data bus interface 604. For example, the GIP 516 sends control instructions through the data bus interface 604 over the bus 608 to the image sensor 602 to control the operation of the CCD 606. The GIP 516 controls the image sensor 602 to transfer the captured image from the CCD 606 through the sensor bus 608 to the memory 518 of the GPU 500. Thus, the captured sensor data does not flow through the host interface 512. In one embodiment, the GIP 516 processes the image stored in the memory 518 to render visual effects directly to a device display 522 using display interface 514.

Thus, in an exemplary embodiment, the GPU 500 controls the image sensor 602 independent of any other component of the smartphone (e.g., independent of upstream host components, such as CPU 522, DMA controller, memory controller, or CPU-controlled bus). By bypassing the host CPU 524, the GPU 500 is therefore able to directly acquire and process captured images faster and more efficiently than conventional systems that utilize a central CPU to control external environment sensors.

Figure 7:
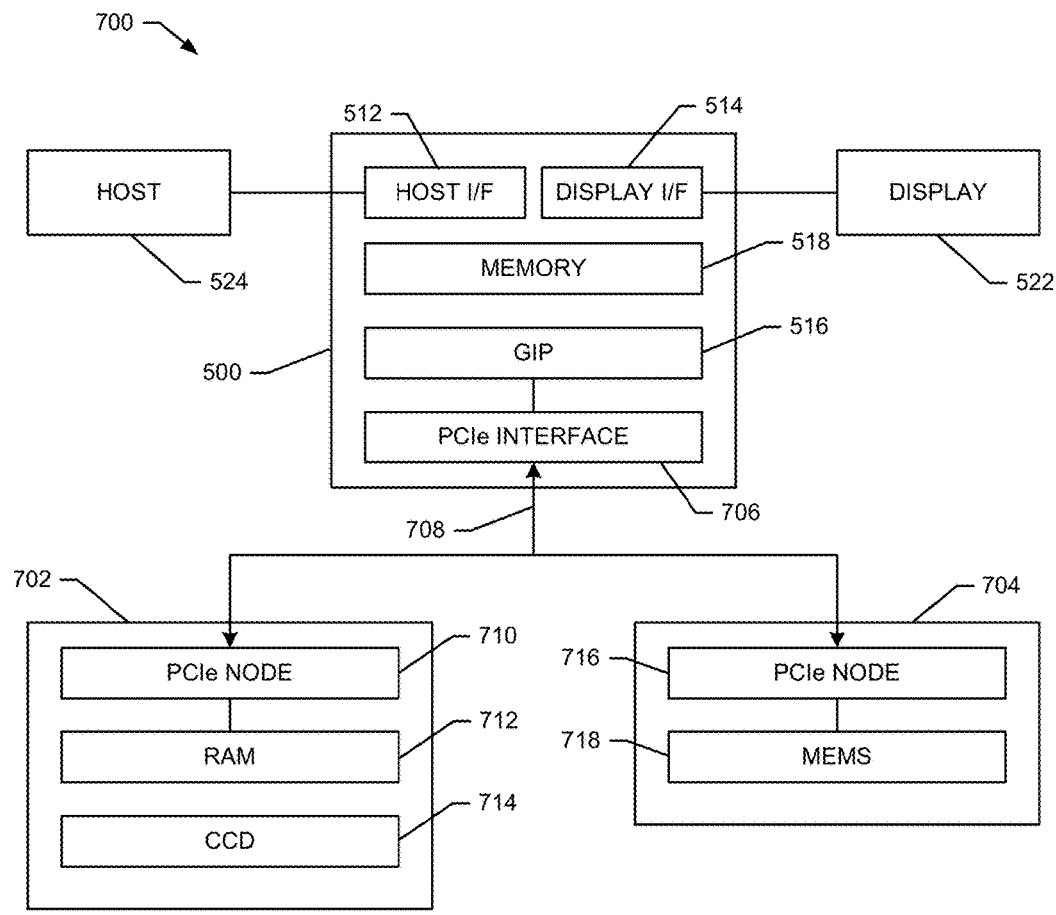
FIG. 7 shows a detailed exemplary embodiment of a graphics processing unit having a sensor interface comprising a PCIe interface.

FIG. 7 shows a detailed exemplary embodiment of a graphics processing unit 500 having a sensor interface comprising a PCIe interface 706.

In an exemplary embodiment, a smartphone is equipped with the graphics processing unit 500 and includes a high resolution, auto-exposing image sensor 702 that comprises PCIe node 710, RAM 712, and CCD 714. The smartphone is also equipped with a MEMS device 704 that includes PCIe node 716 and MEMS sensor 718 (e.g., accelerometer).

The GIP 516 executes instructions to control the image sensor 702 and the MEMS sensor 704 by communicating information between the PCIe interface 706 and the PCIe nodes 710 and 716 using sensor bus 708. The GIP 516 acquires both color and non-color data (e.g., exposure level) from the image sensor 702 through the PCIe interface 706 communicating with the PCIe node 710 over the sensor bus 708. The GIP 516 acquires MEMS data through the PCIe interface 706 communicating with the PCIe node 716 over the sensor bus 708. This allows the GIP 516 to acquire and store image and MEMS data in the memory 518. Thus, the captured sensor data does not flow through the host interface 512. The GIP 516 processes the image and MEMS data stored in the memory 518 to render visual effects directly to a device display 522 using display interface 514.

Thus, the GPU 500 controls the sensors 702 and 704 independent of any other component of the smartphone (e.g., independent of upstream host components, such as CPU 522, DMA controller, memory controller, or CPU-controlled bus). By bypassing the host CPU 524, the GPU 500 is therefore able to directly acquire and process captured sensor data faster and more efficiently than conventional systems that utilize a central CPU to control external environment sensors.

In still another exemplary embodiment, a smartphone is equipped with a GPU having a sensor I/F as disclosed here and an image sensor comprising an ambient light sensor. In an exemplary embodiment, the ambient light sensor is connected directly to the GPU through the sensor I/F, such data bus 604 shown in FIG. 6. The ambient light sensor provides brightness information in the form of ISO exposure values. The GPU controls the ambient sensor and acquires its data through the sensor I/F bus, which bypasses any host CPU and host interface bus. The GPU uses that brightness information as a control parameter for procedures which light and shade three dimensional objects. By bypassing the host CPU, the GPU 500 is therefore able to directly acquire and process captured sensor data faster and more efficiently than conventional systems that utilize a host CPU to control external environment sensors.

Figure 8:
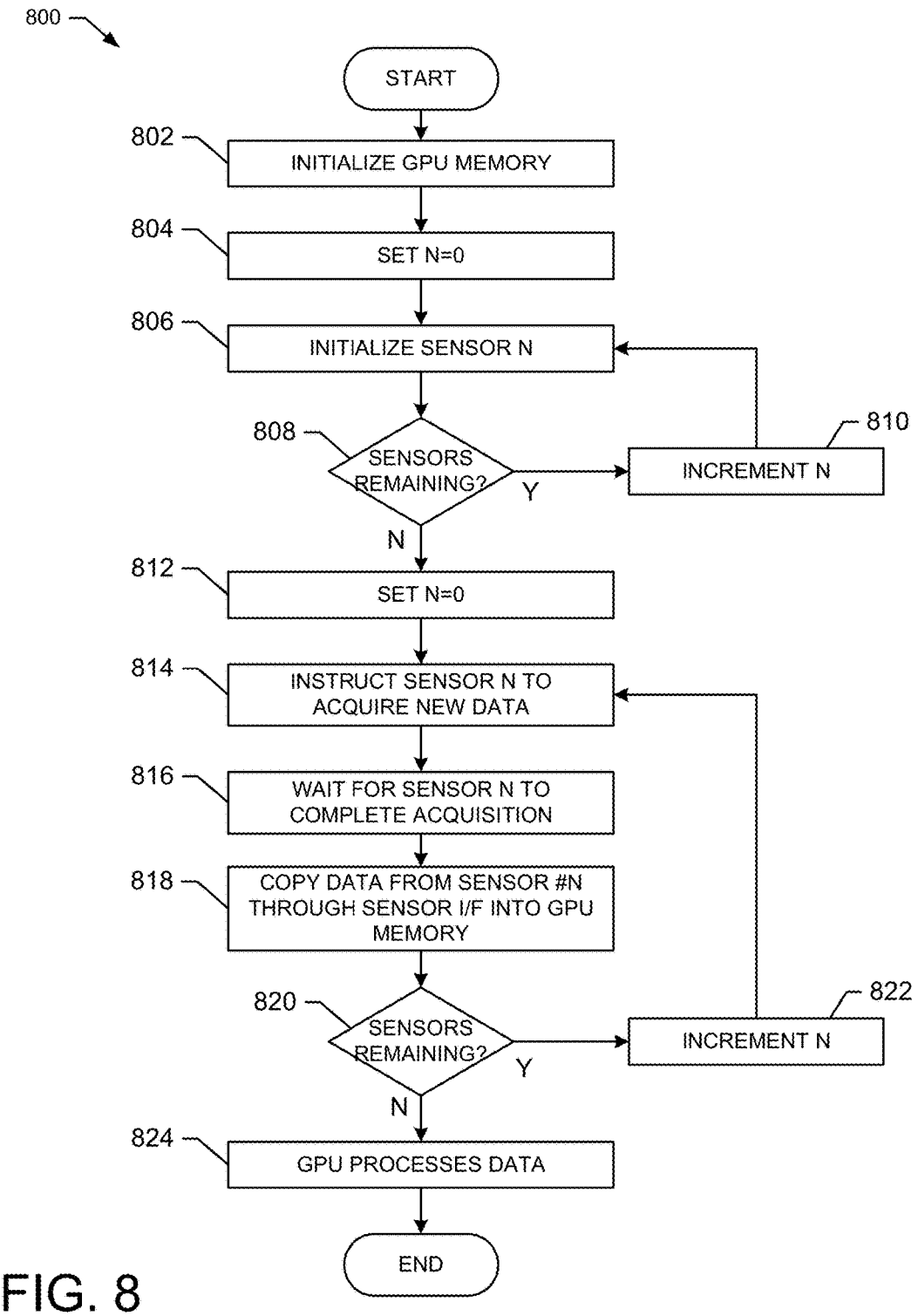
FIG. 8 shows an exemplary embodiment of a method for operating a GPU having a sensor interface to input sensor data directly to the GPU thereby bypassing a host CPU and host interface bus.

FIG. 8 shows an exemplary embodiment of a method 800 for operating a GPU having a sensor interface to input sensor data directly to the GPU thereby bypassing a host CPU and host interface bus. For example, the method 800 is suitable for use with the GPU 500 shown in FIGS. 5-7.

At block 802, GPU memory is initialized. For example, the memory 518 of the GPU 500 is initialized to receive sensor data. In an exemplary embodiment, the GIP 516 perform this function by executing instructions stored in the memory 518 to initialize the memory portion to be used for sensor data.

At block 804, a pointer N is initialized to zero. For example, the GIP 516 of the GPU 500 execute program instructions stored in the memory 518 to initial a pointer N to a value of zero. The initialized value of the pointer N is stored in the memory 518.

At block 806, a sensor pointed to by pointer N is initialized. In an exemplary embodiment, the GIP 516 acquires address information associated with the pointer value and sends initialization commands to the address of the sensor through the sensor interface (e.g., MIPI interface 502) over the sensor bus (e.g., bus 520).

At block 808, a determination is made as to whether there are additional sensors to initialize. In an exemplary embodiment, the GIP 516 determines whether there are additional sensors to be initialized. For example, if the system is equipped with five sensors, the GIP 516 determines whether or not all five sensors have been initialized. If it is determined that there are additional sensors to be initialized, the method proceeds to block 810. If it is determined that there are no additional sensors to be initialized, the method proceeds to block 812.

At block 810, the pointer N is incremented. For example, the GIP 516 of the GPU 500 increments the pointer N to a new value that is associated with another sensor. The pointer value is stored in the memory 518. The method then proceeds to block 806.

At block 812, the pointer N is initialized to zero. For example, the GIP 516 of the GPU 500 initializes the pointer N to a value of zero. Thus, the pointer N points to the first sensor. The pointer N value is stored in the memory 518.

At block 814, the sensor pointed to by N is instructed to acquire new data. In an exemplary embodiment, the GIP 516 retrieve the value of N from memory and acquires addressing information associated with that value. For example, each value of N is associated with a block of addresses stored in the memory that can be used to interact with the sensor associated with that value of N. The GIP 516 use the addresses to send commands to the sensor N through the sensor I/F to instruct the sensor to acquire new data. For example, the GIP 516 sends the commands through the sensor interface (e.g., MIPI interface 502) over the sensor bus (e.g., bus 520) to the selected sensor.

At block 816, the method waits until the sensor pointed to by N completes its data acquisition. In an exemplary embodiment, the GIP 516 sends commands to the sensor N to retrieve the status of the data acquisition. The sensor responds with a status indicator that indicates when the data acquisition is complete. For example, the GIP 516 and the selected sensor communicate using the sensor interface (e.g., MIPI interface 502) over the sensor bus (e.g., bus 520).

At block 818, data from the sensor pointed to by N is copied through the sensor interface into GPU memory. In an exemplary embodiment, the GIP 516 sends commands to the sensor N to copy data acquired by the selected sensor into the memory 518. The sensor responds with a data transmission over the sensor bus that is received by the sensor interface (e.g., MIPI interface 502). The received data is transferred from the sensor I/F 502 to the memory 518.

At block 820, a determination is made as to whether there are additional sensors from which data is to be acquired. In an exemplary embodiment, the GIP 516 determines whether there are additional sensors from which data is to be acquired. For example, a program executed by the GIP 516 may require data from multiple sensors. Each of the sensors is accessed to acquire its data. If it is determined that there are additional sensors to provide data, the method proceeds to block 822. If it is determined that there are no additional sensors to provide data, the method proceeds to block 824.

At block 822, the pointer N is incremented. For example, the GIP 516 increments the pointer N to a new value. The pointer value is stored in the memory 518. The method then proceeds to block 814.

At block 824, the acquired sensor data is processed by the GPU. For example, the GPU processes the data using instructions stored in the memory 518. The processed data can comprise displayable data that can be rendered on a device display. For example, the processed data is transferred to the display interface 514 where it is output on a display bus to render the data on the device display 522.

Thus, the method 800 operates to input sensor data directly to a GPU thereby bypassing a CPU and host interface bus. It should be noted that although the method 800 describes specific operations, these operations may be changed, modified, rearranged, added to, and subtracted from within the scope of the embodiments.

While particular embodiments of the present invention have been shown and described, it will be obvious to those skilled in the art that, based upon the teachings herein, changes and modifications may be made without departing from these exemplary embodiments of the present invention and its broader aspects. Therefore, the appended claims are intended to encompass within their scope all such changes and modifications as are within the true spirit and scope of these exemplary embodiments of the present invention.

What is claimed is:

1. An apparatus, comprising:
a graphics processing unit (GPU) able to process data in a highly parallel manner including:
a host interface having host interface logic to communicate over a host bus with a host central processing unit (CPU);
a graphics instruction processor (GIP) coupled to the host interface and configured to process display images in accordance with sensor data, wherein the GIP, having an instruction processor, sends control signaling over the sensor interface to control the sensor for capturing the sensor data, and wherein the control signaling does not flow through the host interface;
a display interface coupled to the GIP and configured to facilitating displaying the images; and
a sensor interface having sensor interface logic to communicate over a sensor bus;
a sensor connected to the sensor bus and configured to capture the sensor data representing surrounding information to the sensor and forward the sensor data to the GPU through the sensor interface bypassing the host CPU, wherein the sensor data includes images relating to user face, light source, and surrounding ambient light; and
a display coupled to the display interface and configured to display captured surrounding information in response to the display images.

2. The apparatus of claim 1, wherein the sensor interface comprises a mobile industry processor interface (MIPI).

3. The apparatus of claim 1, wherein the sensor interface comprises at least one interface selected from a set comprising camera serial interface (CSI), peripheral component interconnect (PCI), peripheral component interconnect express (PCIE), inter-integrated circuit (I2C), improved inter-integrated circuit (I3C), serial peripheral interface (SPI), and data bus interfaces.

4. The apparatus of claim 1, wherein the sensor comprises at least one sensor selected from a set comprising an image sensor, ambient light sensor, accelerometer sensor, gyroscope sensor, compass sensor, inertial measurement sensor, light source detector sensor, face detector sensor, global positioning system sensor, barometric pressure sensor, altimeter sensor, ultrasonic sensor, MEMS sensor, and time sensor.

5. The apparatus of claim 1, wherein the GPU further comprising a memory to store the sensor data.

6. The apparatus of claim 1, wherein the display interface includes display interface logic to communicate display data over a display bus to the display.

7. The apparatus of claim 1, the apparatus implemented on a system-on-chip (SoC) integrated circuit.

8. A method for operating a graphics processing unit (GPU) having a host interface to communicate over a host bus with a host central processing unit (CPU) and a sensor interface, the method comprising:

sending control signaling through the sensor interface to a sensor to activate a process of capturing sensor data representing surrounding information around the sensor;
acquiring the sensor data sent from the sensor to GPU through the sensor interface, and wherein the sensor data bypasses the host interface;
processing the sensor data by a graphics instruction processor (GIP) to generate display images, wherein the processing the sensor data includes processing the sensor data to generate processed data representing images relating to user face, light source, and surrounding ambient light; and
displaying images reflecting surrounding environment of the sensor in response to the display images via a display interface of the GPU.

9. The method of claim 8, wherein the sensor interface comprises a mobile industry processor interface (MIPI).

10. The method of claim 8, wherein the sensor interface comprises at least one interface selected from a set comprising camera serial interface (CSI), peripheral component interconnect (PCI), peripheral component interconnect express (PCIE), inter-integrated circuit (I2C), improved inter-integrated circuit (I3C), serial peripheral interface (SPI), and data bus interfaces.

11. The method of claim 8, wherein the sensor comprises an image sensor.

12. The method of claim 8, wherein the sensor comprises at least one of an ambient light sensor, accelerometer sensor, gyroscope sensor, compass sensor, inertial measurement sensor, light source detector sensor, face detector sensor, global positioning sensor, barometric pressure sensor, altimeter sensor, ultrasonic sensor, MEMS sensor, and time sensor.

13. The method of claim 8, further comprising storing the sensor data in a memory.

14. The method of claim 8, further comprising outputting the processed data through the display interface.

15. An apparatus, comprising:
a graphics processing unit (GPU) able to process data in a highly parallel manner including:
a host interface having host interface logic to communicate over a host bus with a host central processing unit (CPU);
a graphics instruction processor (GIP) coupled to the host interface and configured to process display images in accordance with sensor data, wherein the GIP, having an instruction processor, sends control signaling over the sensor interface to control the sensor for capturing the sensor data, and wherein the control signaling does not flow through the host interface;
a display interface coupled to the GIP and configured to facilitating displaying the images; and
a sensor interface configured for interfacing with one or more sensing devices; and
a sensor coupled to the sensor interface for interfacing between the sensor and GPU and configured to capture the sensor data representing light source and ambient light obtained from surrounding environment of the sensor, wherein the sensor transmits the sensor data to the GPU bypassing the host CPU.

16. The apparatus of claim 15, wherein the sensor interface includes at least one interface selected from a set comprising camera serial interface (CSI), peripheral component interconnect (PCI), peripheral component interconnect express (PCIE), inter-integrated circuit (I2C), improved inter-integrated circuit (I3C), serial peripheral interface (SPI), and data bus interfaces.

17. The apparatus of claim 16, wherein the sensor includes at least one sensor selected from a set comprising an ambient light sensor, accelerometer sensor, gyroscope sensor, compass sensor, inertial measurement sensor, light source detector sensor, face detector sensor, global positioning sensor, barometric pressure sensor, altimeter sensor, ultrasonic sensor, MEMS sensor, and time sensor.

18. The apparatus of claim 16, wherein the GPU is implemented on a system-on-chip (SoC) integrated circuit.

* * * * *